United States Patent Office 3,682,682
Patented Aug. 8, 1972

3,682,682
PRESSURE-SENSITIVE COPYING MATERIAL
Hans Heinrich Bosshard and Klaus-Dieter Leifels, Binningen, Switzerland, and Bernd Seyberlich, Rheinweiler, Germany, assignors to Ciba-Geigy AG, Basel, Switzerland
No Drawing. Filed Jan. 7, 1970, Ser. No. 1,288
Claims priority, application Switzerland, Jan. 15, 1969, 485/69
Int. Cl. B41m 5/16
U.S. Cl. 117—36.7        6 Claims

ABSTRACT OF THE DISCLOSURE

Pressure-sensitive copying material containing, on a paper-sheet, a white pigment layer containing a finely divided solvent dye and, on another sheet, microballoons containing a solvent for the solvent dye.

---

The present invention relates to a pressure-sensitive copying system and a corresponding copying process.

The subject of the invention is a pressure-sensitive copying system which contains, in or on a carrier material, at least one fat-soluble organic dyestuff distributed in a microdisperse form in such an amount that the appearance of the material containing the dyestuff is at most weakly coloured, with the dyestuff being distributed either in or under a light pigment covering layer or within the carrier material, which optionally contains a light pigment, and with a solvent for the dyestuff distributed in a microdisperse form furthermore being present in a separate phase, either incorporated in the light pigment covering layer or applied to the carrier material or applied to a separate carrier material.

In the first case, the dyestuff is distributed in a light covering layer on the sheet or, without a covering layer, in the sheet, whilst the solvent system which is kept separate is present as the outermost layer on the same sheet and in particular, if a covering layer is present, above the covering layer; if however two sheets are used, the solvent system is present on the underside of the covering sheet (that is to say the upper sheet) whilst the dyestuff is either present together with the light pigment or on the upper face of the lower sheet (that is to say the first-mentioned support sheet) or is incorporated into the lower sheet, with or without addition of a light-coloured pigment, so that, if the dyestuff is uniformly distributed, this sheet can be used from both sides.

If a covering layer is used, then this layer contains the light-coloured or white pigment and between about 0.5 and 2% proportions of fat-soluble dyestuffs, relative to the weight of the pigment.

If the fat-soluble dyestuff is present in the sheet, then this percentage relates to the total amount of the carrier material, that is to say for example of the paper fibres, and can even be less than 0.5%.

Possible pigments are, amongst others, titanium dioxide, barium sulphate, zinc oxide, magnesium sulphate, mica, calcium carbonates such as for example chalk, clays, illuite, gypsum, quartz, powder, silica, sodium silicate, kaolin, talc, organic resins, such as epoxide, phenoplastic and aminoplastic resins, and also organic pigments, such as yellow pigments of the Hansa Yellow group.

The particle size of the pigment should preferably exceed $1\mu$ and is preferably between 5 and $20\mu$. Amongst the organic white pigments, aminoplastics are preferred, for example aminoplastic powders manufactured according to British patent specification 1,043,437 or similar processes. Here the term aminoplastics possesses the wide meaning which is usual amongst experts. It encompasses, above all, the condensation products of aldehydes, especially formaldehyde, optionally in conjunction with other aldehydes, such as acetaldehyde, butyraldehyde, glyoxal, acrolein, furfural and crotonaldehyde, with agents which form aminoplastics, such as urea, thiourea, cyanamide, dicyanamide, aminotriazines, urethanes, guanidine, ammonium thiocyanate, metal thiocyanates, such as calcium or aluminum thiocyanate, guanylthiourea and other urea derivatives or their methylol compounds. Suitable urea derivatives are, for example, alkylureas or arylureas and alkylthioureas or arylthioureas, alkyleneureas or alkylenediureas, such as ethyleneurea and propyleneurea, dihydroxyethyleneurea and acetylenediurea.

Possible triazine components, in addition to melamine as the most important representative, are also N-substituted melamines, such as N-butylmelamine, N-phenylmelamine, N-tolylmelamine, N,N-diallylmelamine and N-tert.-octylmelamine, as well as melam, melem, ammeline, ammelide, 2,4-diamino-6-phenylamino-1,3,5-triazine, aminotriazines substituted by allyloxy groups, guanamines, such as formoguanamine, acetoguanamine, caproguanamine, capryloguanamine, lauroguanamine, steroguanamine, linoleoguanamine, $\Delta^3$-tetrahydrobenzoguanamine, hexahydrobenzoguanamine, benzoguanamine and o-, m- and p-toluguanamine.

The aminoplastic resins which can be used according to the invention can also contain modifying additives or can be sulphurised. This includes the addition of phenol, cresols, xylenols, butylphenols, octylphenols and nonylphenols and also salicylic acid, especially in the form of precondensates based on formaldehyde-phenol, formaldehyde-cresol or formaldehyde-xylenol, it being possible to added the methylol compounds or more highly condensed novolacs at any desired condensation stage. Further additives include proteins, such as acid casein, alkyd resins, ethyleneimine polymers and natural resins. Preferably, resins during the curing or condensation of which surface-active substances were present are used, with both non-ionic and also ionic representatives of this class of substances being possible, such as for example non-ionic polyalkylene-ethers or natural substances such as tragacanth, gum arabic, anionic fatty alcohol sulphates, alkylarylsulphonates, isomerised abietic acid, salts of sulphosuccinic acid esters or cationic quaternary ammonium bases.

Suitable epoxide resins which can be used in powder form as a porous covering layer, are for example obtained by curing water-soluble polyepoxides with thiourea and suitable drying and comminution.

The pigments of the light covering layer can also be replaced at least partially by other organic resin powders of thermoplastic, for example by polyethylene powder and nylon powder.

The dyestuffs which are suitable for the copying material can belong to the most diverse classes of dyestuffs, such as for example to the azo, anthraquinone, phthalocyanine, triarylmethane, azine and nitro dyestuffs. These dyestuffs must possess good solubility in organic solvents, so that they can be generally grouped together under the term solvent dyes. An explanation of the term solvent dyes (of which the term fat-soluble dyestuffs is a synonym) and examples of these dyestuffs are given in the Colour Index, second edition, 1956, volume 2, pages 2815 and thereafter.

In order to manufacture the copying material, the procedure followed is that firstly a pigment-dyestuff suspension is applied to the carrier or the dyestuff and optionally the light pigment is already incorporated into the carrier material during its manufacture. The material coated or prepared in this way shows only a slight intrinsic colour, which can however be cancelled by coating with, or incorporation of, a white pigment.

The carrier can also first be treated with a dyestuff which is dissolved in an organic solvent, or the dyestuff can be applied in a microdisperse form in a suitable diluent, for example water or an organic solvent, onto the carrier, and then covered over with the appropriate pigment layer. The thickness of this covering layer can be varied within certain limits. It must on the one hand possess such covering power that the intrinsic colour of the colour layer is masked as far as possible, but must on the other hand, under the writing pressure exerted, not prevent the solvent from reaching the dyestuff and the resulting dyestuff solution from showing the desired coloured copying effect.

Water-soluble binders, such as alginates and polyvinyl alcohol, for example serve as binders for the white layer if paper is used as the substrate.

If the dyestuff is to be distributed in the carrier material itself, the papers for this purpose are manufactured in a manner which is in itself usual; however, the finely divided oil-soluble dyestuff, which must be insoluble in water, and optionally also a finely divided light pigment, are added to the aqueous paper pulp. Advantageously, the permeability of the paper to organic solvents is reduced, or the so-called "solvent hold-out" (that is to say the ability of the paper only to take up a little solvent) is improved, by incorporation of polysaccharides and their derivatives, such as starch, vegetable gum or alginates. The paper is sized in the usual manner with the resins or also with ketenes of higher fatty acids such as stearic acid. In this case the microcapsules must either be applied to the outside of the carrier material or applied to a separate sheet.

The solvent for the dyestuff must be kept separate from the pigment-dyestuff system and must be released by the use of pressure. There are several known processes for applying solvents or liquids, generally in a very finely divided form and isolated from any other system, onto a carrier. A preferred method is the encapsulation of the solvent in microcapsules. Such capsules are for example manufactured by dissolving a macromolecular wall material, for example gelatine, in water, adding the material to be encapsulated (in the case of a solvent the latter must not be miscible with water, in order to obtain a solvent emulsion) and then bringing about a phase separation by adding further high molecular components, such as for example gum arabic, by changing the pH or by warming, whereupon the wall material then surrounds the emulsified solvent particles. Thereafter the wall material which is still liquid is consolidated by a curing process.

These microcapsules can then, if they are applied in large amounts next to one another on a carrier sheet, be broken open by pressure, such as arises for example on writing and printing. The substances chosen for the wall formation of the microcapsules must not only be capable of breaking open by pressure but must also not react with the solvent, so that the capsule wall remains undamaged under normal storage conditions. In the preferred case, in which microcapsules are used, the latter can either be incorporated into the carrier material or cover the carrier material in the form of a thin layer. The capsule material is preferably fixed to the carrier by means of a suitable adhesive. Since paper is the preferred carrier material, these adhesives are predominantly paper coating agents, such as for example gum arabic, polyvinyl alcohol, hydroxyethylcellulose, casein, methylcellulose or dextrin.

The size of the capsules should in general not be greater than $50\mu$. The preferred upper limit is however $15\mu$. Preferably, the size is between 5 and $10\mu$. The amount of capsule composition per square metre of carrier material is on average 5–10 g./m.$^2$, and the amount of the solvent about 10 to 30 g./m.$^2$.

The capsule broken by the use of pressure must release a solvent which is capable of dissolving the dyestuff in the pigment-dyestuff system; only in this way can a colour trace, and hence the desired coloured copy, be produced. The solvent can be volatile or non-volatile. Furthermore, it is also possible to use a solvent mixture which contains volatile and non-volatile constituents. Suitable volatile solvents are, for example, chloroform, perchlorethylene, ethyl acetate, benzene, toluene, xylene and the low-boiling petroleum ether fractions. Examples of non-volatile solvents are tricresyl phosphate, dioctyl phthalate, trichlorobenzene, nitrobenzene, trichlorethyl phosphate, paraffin oil and petroleum ether fractions of high boiling point.

In addition to the good ability of the solvent to dissolve the dyestuff, and the maximum colouration of the marking position which is associated therewith, care should be taken when choosing the solvent that there should be no impairment of the script image on the sheet receiving the script, such as say drop formation or running of the script. In such a case the solvent is preferably so chosen that it evaporates adequately and disappears sufficiently rapidly from the marking position.

If it is desired that the transparent areas in the covering layer, which represent the script image, should be fixed particularly durably, it is possible to use (1) as the organic liquid, a solution of an organic resin which (a) represents a non-drying resin or (b) represents a drying resin or oil, or (2) as the organic liquid, a stabilised monomer, by itself or mixed with an organic solvent.

Non-drying resins which can be dissolved in the organic liquid are phthalate resins, alkyd resins, styrene-modified alkyd resins, soluble modified phenol-formaldehyde resins and aminoplastic resins, ketone resins, as well as natural resins such as colophony, copals and shellac, and ethylated starch, which must all be of low viscosity, that is to say must exhibit low K values.

Drying resins or oils are above all linseed oil, wood oil, oiticica oil, styrene-modified oils and styrene-modified unsaturated polyester resins.

Monomers which can, if necessary, contain a stabiliser, such as for example hydroquinone, are for example styrene, divinylbenzene and acrylic esters, such as for example butyl acrylate or methyl methacrylate.

In order to achieve more rapid drying or resinification or polymerisation, a sufficient amount of a polymerisation catalyst can be added to the light or white pigment, such as peroxide (for example dibenzoyl peroxide) and also, optionally, activators, such as reducing agents or driers (for example cobalt naphthalate in the presence of cyclohexanone or methyl ethyl ketone peroxide).

Possible carrier materials are the papers which are customary and known for copying purposes, and to the extent that a covering layer containing the dyestuff is applied, also fibre fleeces of synthetic fibres, such as polyesters or acrylic fibres, and films of cellulose, synthetic polymers and metals such as aluminum.

In the present application, the definition "paper" not only includes normal papers manufactured from cellulose fibres, but also papers in which the cellulose fibres are completely, but preferably only partially, replaced by synthetic fibres of polymers.

The copying material obtained according to the invention permits copies to be made in any desired shade, since a large number of dyestuffs and dyestuff mixtures can be employed. The dyestuffs are incorporated in a light-coloured or white pigment or are covered by such a pigment, so that the copying material looks like a usual white writing paper. It is resistant to handling and wiping and additionally is ageing-resistant. The copied signs and marks appear clearly and sharply on the script-receiving sheet and are stable for a prolonged period without fading or running.

In the examples which follow the parts denote parts by weight and the percentages denote percentages by weight.

EXAMPLE 1

(A) Pigment-dyestuff system (I) 500 parts of titanium dioxide (anatase or rutile) are very finely ground in 750 parts of an aqueous solution of 25 parts of polyvinyl alcohol in 725 parts of water in a ball mill.

Instead of polyvinyl alcohol, 30 parts of gum arabic can also be employed.

(II) 20 parts of the dyestuff of formula $$\left[O_2N-\underset{OH}{\bigcirc}-N=N-\underset{HO}{\bigcirc}\right]_2 \cdot Cr$$

5 parts of a condensation product of formaldehyde and naphthalenesulphonic acid and 100 parts of water are also very finely ground in a ball mill.

20 parts of (I) and 0.4 part of (II) are intensively stirred together and then applied to suitable papers and dried. In order to mask the intrinsic colour, the pigment-containing paper can further be coated with a thin layer of (I).

(B) Solvent system

A mixture of 1 part of trichlorethyl phosphate and 1 part of trichlorobenzene (isomer mixture) is encapsulated as described below.

The capsule composition is used in the presence of polyvinyl alcohol for coating paper.

The two papers coated in the manner described form a pressure-sensitive copying system: one writes on the paper coated on the underside with the capsule composition, whereupon the copy appears in a dark grey to black script on the paper containing pigment on the upper side.

The solvent is encapsulated in the following manner:

10 parts of gelatine are dissolved in 90 parts of water. 100 parts of the above-mentioned solvent mixture are added at 45 to 55° C. and emulsified. A solution of 10 parts of gum arabic and 90 parts of water is added whilst stirring. This emulsion is poured out into 700 ml. of water at 50° C. whilst stirring. The subsequent curing takes place with 6 parts of glutardialdehyde at about 30° C.

After the curing, 25 parts of polyvinyl alcohol are added and a suitable paper is coated with this composition.

Instead of the above-mentioned dyestuffs, the following dyestuffs can also be used:

Dyestuff of formula

[anthraquinone structure with O, NH₂, O, NH-phenyl]   blue

Mixture of equal parts of the dyestuffs of formulae

[phenyl-N=N-C(HO)-N(C₆H₄Cl), with C=N, H₃C ring]   green

[anthraquinone structure with O, NH₂, O, NH-phenyl]

Dyestuff of formula

[phenyl-N=N-phenyl-N=N-naphthyl-NHC₆H₅]   red

EXAMPLE 2

Paper is dyed with a solution of 1 part of Nigrosin (Colour Index 50415B) in a mixture of 20 parts of acetone and 20 parts of ethyl alcohol, and is dried.

One side of the paper is coated with the following pigment preparation:

500 parts of zinc oxide are very finely dispersed in 750 parts of an aqueous solution of 25 parts of polyvinyl alcohol and 700 parts of water.

In combination with the paper described in Example 1, which is coated with encapsulated solvent, a pressure-sensitive copying system is obtained. The copy appears in violet-black script.

EXAMPLE 3

Paper is dyed with a solution of 1 part of the dyestuff of formula

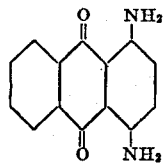

in 30 parts of methyl ethyl ketone, and is dried. One side of the paper is coated with the titanium dioxide preparation described in Example 1. In combination with a paper which is coated with the encapsulated solvent mixture of equal parts of tricresyl phosphate and perchlorethylene, a pressure-sensitive copying system is obtained which shows the copy in red script.

EXAMPLE 4

Paper is coated with a mixture of equal parts of the dyestuff-white pigment composition and solvent-containing capsule composition described in Example 1. In combination with an untreated paper, a copying system is obtained. The copy appears in dark grey script on the coated side.

EXAMPLE 5

The dyestuff of formula

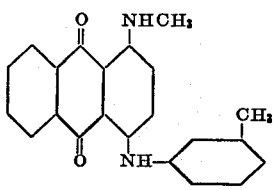

is very finely ground in a ball mill in the presence of the condensation product of formaldehyde and naphthalene-sulphonic acid. 3% of polyvinyl alcohol are added as a thickener and binder to 10 parts of an aqueous dispersion which contains 20% of this dyestuff. Paper is impregnated with this printing ink, and is dried.

For masking the intrinsic colour, a 6μ thick layer of the titanium dioxide preparation described in Example 1 is applied.

Together with a paper which contains an encapsulated solvent, a pressure-sensitive copying system is obtained which shows a blue copying script.

EXAMPLE 6

15 parts of the dyestuff C.I. Solvent Black 1 and 5 parts of a polymetaphosphate (Calgon PTH of Messrs. Benckisser) are ground in 100 parts of water in a ball mill to a particle size of about 5μ.

Crude paper was primed with a preparation of the following nature in order to improve the "solvent hold-out": 5 g./l. of sodium alginate and 15 g./l. of an etherified methylolmelamine (Pergaprint A of Messrs. CIBA AG., Basel). The amount applied is 1 g./m.² dry weight.

This paper is coated with the dyestuff dispersion described above, with the addition of 40 g./l. of starch, the amount applied being 1 g./m.² dry weight.

The dyestuff layer is coated with a dispersion consisting of 200 parts of a finely divided cured melamine-formaldehyde resin having an internal surface of 72 m.²/g., 30 parts of polyvinyl alcohol and 970 parts of water, in such a way as to produce a smooth white surface. The amount applied is 10 g./m.² dry weight.

The melamine-formaldehyde resin used is obtained in the following manner:

6.3 parts of a high molecular sodium carboxymethylcellulose are dissolved in 315 parts of water, 450 parts of 30% strength aqueous formaldehyde solution are added, and the mixture is adjusted to pH=7 with dilute sodium hydroxide solution and warmed to 70° C. 180 parts of urea are added and the mixture condensed for 3 hour at pH=7 and 70° C.

The precondensate thus obtained is cooled to 50° C. and rapidly mixed with a solution of 9.7 parts of sulphamic acid in 300 parts of water which has also been warmed to 50° C. The gel formation starts after 12 seconds and the temperature rises to 60–65° C. The gel is left for 3 hours at this temperature, and is comminuted in a cutter-granulator, suspended in a 1–2-fold amount of water, centrifuged off, washed and dried at 80° C. in a stream of air. After cooling, the product is deagglomerated by grinding in a pin mill.

230 parts of a white powder having a bulk density of about 77 g./litre and a specific gravity of 1.46 g./cm.³ are obtained. The electron-microscopic picture shows approximately spherical individual particles having an average diameter of 400 A. The specific surface is 72 m.²/g.

Together with a paper which has been coated with encapsulated solvent, a pressure-sensitive copying system which yields a black script is obtained.

The microcapsules were manufactured as follows: a sol is prepared from 20 parts of gum acacia dissolved in 160 parts of water, and 80 parts of the above-mentioned solvent mixture are emulsified therein. A second sol, consisting of 20 parts of pigskin gelatine having an iso electric point at a pH value of 8, and 160 parts of water, is mixed with the emulsion. Water is squirted into this mixture for 1 hour with constant stirring. All previous steps are carried out with constituents which are at a temperature of 50° C. The resulting mixture is poured into such an amount of water at 0° C. that the total weight is 1500 parts. The mixture is stirred and left to stand for 1 hour at a temperature not exceeding 6° C. The subsequent curing is carried out with 10 parts of glutardialdehyde at 30 to 35° C.

EXAMPLE 7

A paper is coated with a pigment-dyestuff system according to Example 1A so that the amount applied is 10 g./m.² dry weight. The layer, which appears grey, is coated over with the dispersion of melamine-formaldehyde condensate described in Example 6 in such a way that a white surface is produced. The amount applied is 5 g./m.² dry weight.

1 part of trichlorethyl phopshate, 1 part of trichlorobenzene and 0.2 part of a ketone resin manufactured from cyclohexanone and methylcyclohexanone by condensation with sodium hydroxide solution (trade name Synthetic Resin AWL of BASF: softening point 75 to 85° C. according to DIN 53180) are encapsulated as described in Example 1. Paper is coated with this capsule composition, applying 8 g./m.².

The paper containing the dyestuff forms a pressure-sensitive copying material with the paper carrying the solvent, yielding a black script.

EXAMPLE 8

Instead of the dyestuff C.I. Solvent Black 1 mentioned in Example 6, the following dyestuffs can be used:

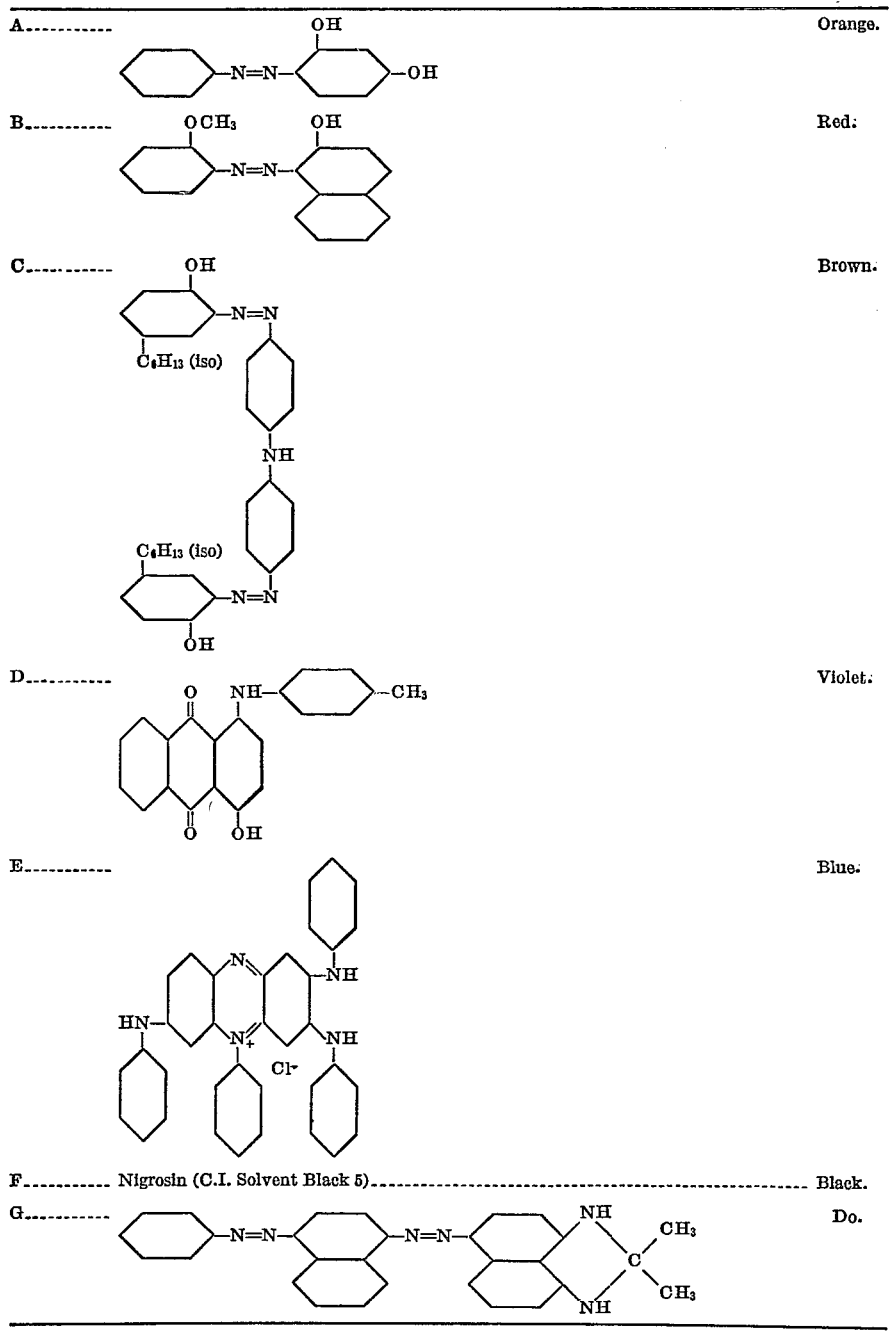

| | | |
|---|---|---|
| A | [structure] | Orange. |
| B | [structure] | Red. |
| C | [structure] | Brown. |
| D | [structure] | Violet. |
| E | [structure] | Blue. |
| F | Nigrosin (C.I. Solvent Black 5) | Black. |
| G | [structure] | Do. |

EXAMPLE 9

Pigment-dyestuff system (coating composition)

70 parts of titanium dioxide and 30 parts of calcium carbonate as well as 0.3 part of polyphosphate as a dispersing agent are well dispersed in 50 parts of water. Thereafter 50 parts of a 20% strength starch solution of medium viscosity are added whilst stirring. (The starch is dissolved, to give a 20% strength solution, over the course of 20 minutes at 90° C.) Finally, 20 parts of a 50% strength butadiene latex (trade name Dow-Latex 636) are added, again whilst stirring. The coating composition of the above formulation is now adjusted to a solids content of 50% by adding water.

The dyestuff 1 - methylamino-4-(m-toluidino)-anthraquinone is very finely ground in a ball mill in the presence of the condensation product of formaldehyde and naphthalenesulphonic acid, in an aqueous dispersion which contains 20% of this dyestuff. 2.4% of dyestuff (relative to the solids content) are added to the above coating composition whilst stirring.

The coating composition manufactured in this way, which is almost colourless, is applied to suitable papers by means of usual application devices (for example blade coater, sizing press) and dried. The weight applied is 8 to 10 g./m.² The coated papers are subsequently firmly calendered in order to give the coating a high surface smoothness and an unbroken surface.

The solvent system is the same as described in Example 1 under B.

The two papers manufactured in the manner described form a pressure-sensitive copying system which is characterized in that the resulting copy possesses sharp edges, that the pigment coating is white and that this copying paper does not differ in appearance from customary coated papers. The copy appears in blue script.

EXAMPLE 10

100 parts of bleached sulphite cellulose are beaten in a Hollander or other usual beating systems using a material density of 4 to 6%, to 55° fineness according to Schopper-Riegler (=Canadian Freeness value of 180 according to DATA Sheet No. Z-5 of the Canadian Pulp and Paper Association) and subsequently run out into a mixing vat. 12 parts of titanium dioxide and 18 parts of kaolin (commercially available brands) are added in the mixing vat. In the subsequent procedure, 0.3 part of the dyestuff described in Example 9 are metered into the material suspension. 1 part of cationic starch or 2 to 4 parts of a galactomannane can be used to improve the "solvent hold-out."

The material suspension prepared in this way is now sized in the usual manner with 2 parts of resin size and 3 parts of aluminium sulphate. The material mixture comes to the paper machine via further stages of the paper manufacturing process. Shortly before the material is laid down, a retention agent is added in order to improve the filler yield. The papers manufactured on the paper machine in this manner possess weights per unit area of 35 to 45 g./m.$^2$.

The solvent system is the same as described in Example 1 under B.

The two papers manufactured in the manner described form a pressure-sensitive copying system which is distinguished in that the resulting copy possesses sharp edges that the paper does not differ in appearance from other papers, and that the manufacture is simple because no additional upgrading process is necessary for the actual copy carrier.

We claim:

1. Pressure-sensitive copying material system which contains, in or on a carrier material, at least one solvent dye distributed in a microdisperse form in such an amount that the appearance of the material containing the dyestuff is at most weakly colored, with the dyestuff being distributed in a light pigment covering layer or within the carrier material, which optionally contains a light pigment, and an encapsulated solvent for the dyestuff distributed in a microdisperse form incorporated into the light pigment covering layer or applied to a separate carrier material.

2. Pressure-sensitive copying material system according to claim 1 wherein both a dyestuff distributed in a microdisperse form in the white pigment, and also, simultaneously, a solvent for the dyestuff in an encapsulated form, are present on a carrier sheet.

3. Pressure-sensitive copying material system according to claim 1 wherein a carrier sheet contains the dyestuff distributed in a microdisperse form together with a white pigment layer and a second sheet is coated with a capsule composition in which the solvent is present.

4. Pressure-sensitive copying material system according to claim 1 wherein a two-layer construction of one carrier sheet, with the lower layer essentially consisting of an inorganic white pigment with an organic dyestuff finely distributed therein and the upper layer consisting of a dyestuff-free inorganic white pigment, and with the encapsulated solvent is present on a second carrier sheet.

5. Pressure-sensitive copying material system according to claim 1 wherein a uniform distribution of finely divided dyestuff and optionally also of a white pigment within the paper carrier sheet, and a second carrier sheet on which the encapsulated solvent is present.

6. Pressure-sensitive systems according to claim 1 wherein the light or white pigment is a cured aminoplastic powder.

References Cited

UNITED STATES PATENTS

| | | | |
|---|---|---|---|
| 2,854,350 | 9/1958 | Phillpotts | 117—36.7 |
| 3,109,748 | 11/1963 | Newman | 117—36.7 |
| 3,111,407 | 11/1963 | Lindquist et al. | 117—36.7 |
| 3,561,991 | 2/1971 | Baum | 117—36.7 |

FOREIGN PATENTS

| | | | |
|---|---|---|---|
| 733,868 | 5/1966 | Canada | 117—36.7 |

MURRAY KATZ, Primary Examiner

U.S. Cl. X.R.

117—155 UA; 162—162